(12) United States Patent
Borngräber et al.

(10) Patent No.: US 7,215,881 B2
(45) Date of Patent: May 8, 2007

(54) MOBILE COMMUNICATIONS EQUIPMENT WITH BUILT-IN CAMERA

(75) Inventors: Frank Borngräber, Senden (DE); Christian Zündt, Erolzheim (DE)

(73) Assignee: Nokia Corporation, Espoo (FI)

( * ) Notice: Subject to any disclaimer, the term of this patent is extended or adjusted under 35 U.S.C. 154(b) by 827 days.

(21) Appl. No.: 10/322,611

(22) Filed: Dec. 19, 2002

(65) Prior Publication Data

US 2004/0120552 A1 Jun. 24, 2004

(51) Int. Cl.
*G03B 29/00* (2006.01)
*H04M 1/00* (2006.01)
*H04N 7/14* (2006.01)

(52) U.S. Cl. .................. 396/15; 396/18; 396/429; 455/556.1; 348/14.02

(58) Field of Classification Search .................. 396/15, 396/18, 73–75, 429; 345/166
See application file for complete search history.

(56) References Cited

U.S. PATENT DOCUMENTS

| 5,406,413 | A * | 4/1995 | Mogamiya ................. 359/511 |
| 5,892,985 | A * | 4/1999 | Matsuyama ................ 396/18 |
| 6,809,723 | B2 * | 10/2004 | Davis ........................ 345/166 |
| 6,996,258 | B2 * | 2/2006 | Nakamura et al. ......... 382/124 |
| 7,016,520 | B2 * | 3/2006 | Butterworth ............... 382/124 |
| 2002/0008768 | A1 * | 1/2002 | Takada et al. ......... 348/333.03 |

* cited by examiner

*Primary Examiner*—W. B. Perkey
(74) *Attorney, Agent, or Firm*—Alston & Bird LLP

(57) ABSTRACT

A portable communication apparatus having a camera module with a camera lens. The apparatus comprises a correction lens arranged to facilitate for said camera module to register a sharp image of an object which is in an immediate vicinity of said correction lens. The apparatus also comprises a controller coupled to said camera module and being arranged to perform an analysis of the registered image of said object and provide an output which is indicative of a result of said analysis.

14 Claims, 4 Drawing Sheets

MOBILE COMMUNICATIONS EQUIPMENT WITH BUILT-IN CAMERA

TECHNICAL FIELD OF INVENTION

This invention relates to a portable communication apparatus comprising a camera module with a camera lens and a method for a portable communication apparatus for accessing a communication network.

BACKGROUND ART

To input data in a portable communication apparatus, for example a mobile phone, there are besides pushing keys on the apparatus many different types of man-machine interface solutions.

One example is a space-saving optical mouse for a mobile phone developed by Dutch researchers at the Philips Center for Industrial Technology and described on the Internet page [http://optics.org/articles/news/8/6/23/1]. The optical mouse is made up of laser diodes and a detector placed beneath a lens. The light from the laser is focused on an object, such as a fingertip, and is reflected back and thereby mixes within the internal laser cavity. A disadvantage with this technique is that it is implemented using expensive, dedicated laser technology.

The use of fingerprint is well known for controlling access to different types of systems. In WO 01/11577 A1 a system for checking the right to access sensitive information using biometric data is described.

When sharing a mobile phone between users today the users also have to share the memory content of these mobile phones, that is phonebook and calendar and the only possibility for secrecy and privacy is exchanging SIM cards when switching user. This way the different users at least get their own phonebook and inbox for SMS-messages.

SUMMARY OF THE INVENTION

In view of the above, an objective of the invention is to provide a portable communication apparatus with an effective man-machine interface which enables access control.

The invention provides, according to a first aspect, a portable communication apparatus having a camera module with a camera lens, the apparatus comprising a correction lens arranged to facilitate for said camera module to register a sharp image of an object which is in an immediate vicinity of said correction lens, and a controller coupled to said camera module and being arranged to perform an analysis of the registered image of said object and provide an output which is indicative of a result of said analysis.

The camera module can be integrated with the portable communication apparatus. A standard built-in camera has a focal length of about 3.5 mm to register images in the normal mode, which has a scale of about 1:1. With this lens the images will be sharp within a range of 20 mm to infinity. The correction lens changes the focal length of the camera and is preferably arranged in such a way that the camera module registers a sharp image of the object in contact with or close to the correction lens. An object can be in contact with the correction lens when placed on the correction lens. The correction lens is preferably made scratch resistant as the scratches would compromise the analysis. The correction lens can for example be made of plastic, polycarbonate, glass or crystal glass.

As the camera lens has such a wide focus interval the correction lens need not be more complicated than a common magnifying glass or a common macro filter as are well known in the technical field of optics.

The object can for example be a finger or a pen.

The analysis can be done on one image or a number of images in a time period.

The correction lens also provides for an alternative to a touchpad or pen pad, and the finger or a pen could be used to control GUI (Graphical User Interface) as with a normal mouse or trackball.

In an embodiment of the invention the correction lens is arranged to be moveable between a first position, in which the correction lens has optical influence on the camera module, and a second position, in which the correction lens has no optical influence of the camera module.

The correction lens can be arranged removable in such a way that the correction lens can be removed from the camera lens when not used. When an object is to be registered the correction lens can be moved in place over the camera lens. This can be done by a finger that is going to be registered. The movement of the correction lens can be used to scan an object dynamically. For example if a fingerprint is to be scanned, a part of the fingerprint is registered when the finger is slid by. The camera module can then be arranged to register a number of images when the correction lens is in a moving state between the first position and the second position. The whole fingerprint is captured in a number of images taken in a sequence.

In another embodiment of the invention the correction lens is arranged to be moveable in a slide guide.

In this way the movement of the correction lens is controlled.

In one embodiment the portable communication apparatus further comprises a detector to indicate to said controller when the correction lens is in said first position.

The detector can be a switch or a contact. An advantage with this is that the user quickly and accurately gets an indication of when the correction lens is in place.

In another embodiment the portable communication apparatus further comprises light means for illuminating the object.

In this way a user of the portable communication apparatus gets an indication of when the correction lens is in place over the camera. The light guide can indicate that the fingerprint analysis is to be performed.

In one embodiment the portable communication apparatus further comprises a cleaning felt arranged adjacent to the correction lens so as to clean said camera lens when said correction lens is moved between said first position and said second position.

A camera lens of the camera module is then cleaned when the correction lens is moved over the camera lens. The felt is arranged to be in contact with the camera lens, or a filter arranged to protect the camera lens, such as a skylight filter as commonly used in photography, when the correction lens is moving. An advantage with the felt is that it provides for better image quality and thus more secure and reliable results from the analysis. The felt can be of a similar type used in CD feeding tray of most car stereos.

In another embodiment the apparatus is a mobile telephone.

An advantage with implementing the invention in a mobile telephone is that it provides an easy way for authentication. There is no need for the user to remember a pin code. This has particular benefits for very young or very old users and users that are mentally handicapped and in some way having problems remembering number codes.

Another advantage is that it is much easier to press ones finger against a certain spot than hit four keys consecutively in a certain order which will make it easier for people having physical handicaps to use and unlock a mobile phone.

In one embodiment the apparatus is a PDA having wireless communication capabilities.

In one embodiment the portable communication apparatus further comprises an IR detector arranged adjacent to the correction lens and coupled to said controller so as to detect and report presence of said object.

If the object is a finger, the IR detector could be sensing the body heat from the finger. When the heat is detected, the camera can be arranged to register an image.

In one embodiment of the invention said object is a finger, said controller is adapted to analyze a fingerprint of said finger and said output is a user identity associated with said fingerprint.

The analysis of the image can for example be a fingerprint analysis for authentication. The scanning of the fingerprint can be made static, i.e. taking one image of the whole fingerprint. The analysis can also for example be done to track the movement of a finger or a pen. This can be done by using Image Correlation Processing (ICP). The ICP algorithm compares a number of images in a time period, e.g. 1500 images per second.

By using a fingerprint authentication process it is easy to implement multi-user access to the same portable communication apparatus as the user identity can be tied to the fingerprint. One fingerprint implies one user. As a fingerprint is analyzed it is compared to a list of approved fingerprints. A respective user identity can be set to correspond to each of the approved fingerprints thus, providing for different profiles for different users. An advantage with using fingerprint instead of PIN-code in multi-user access is that it is quicker since the user would have to input a user identity along with the PIN-code. The problem with remembering the PIN-code is also solved. Additionally the risk of someone guessing a correct PIN code increases with the number of users of a common portable communication apparatus when the PIN codes are not tied to a specific user identity.

In another embodiment said object is an eye, said controller is adapted to analyze the iris of said eye and said output is a user identity associated with said iris.

In one embodiment the apparatus is used as a cursor position controlling device.

In another embodiment of the invention the controller is adapted to analyze a movement of said object.

According to a second aspect, the invention also involves a method for a portable communication apparatus for accessing a communication network, the portable communication apparatus having an equipment identity, the method comprising the steps of providing a plurality of object identities and a plurality of associated subscriber identities in the apparatus, registering an object identity, matching the registered object identity with said plurality of object identities sending, if there is a match, the subscriber identity associated with the matching object identity along with the equipment identity to the mobile communication network, and logging on to the mobile communication network.

This enables multi-user access of the phone without switching the SIM (Subscriber Identity Module) card. The different users could have their own subscriber identity stored in the phone.

In one embodiment of the invention the object identity is a fingerprint.

In another embodiment of the invention the object is an eye.

In one embodiment of the invention a plurality of object identities are associated with the same subscriber identity. In this embodiment for example family members can share the same mobile phone and service subscription and still not have to enter a common PIN code, but still be individually identified.

According to a third aspect the users sharing the same subscriber identity can have individual profiles on the same portable communication apparatus constituting a portable communication apparatus having an internal memory, in which user data and application data are stored along with profile data, and at least one user profile identity wherein the profile data are specifying which user data should be accessible for a user according to which of the at least one user profile identities the user is using, the profile data thereby controlling access to different parts of the memory for different internal user identities.

Embodiments according to this aspect provides the possibility of setting up different data profiles for different situations. One benefit of this is increased security as a user now can set up different profiles for different types of data and as a switch between these profiles could require a new identification to be done secret data could be kept inside one profile and still be protected even if the mobile phone would be stolen in an unlocked mode.

According to a fourth aspect, the invention also involves a method for a system comprising a portable communication apparatus having an equipment identity and a mobile communication network, the method comprising the steps of providing a plurality of object identities and a plurality of subscriber identities associated with at least a respective one of said object identities in the apparatus, registering an object identity, matching the registered object identity with said plurality of object identities sending, if there is a match, the subscriber identity associated with the matching object identity along with the equipment identity to the mobile communication network, and logging on to the mobile communication network.

Logging on to the mobile communication network is a well known procedure and can comprise the steps of receiving a number from the mobile communication network, calculating a response, and sending the response to the mobile communication network.

In one embodiment of the invention the portable communication apparatus has a subscriber identity module and the communication network has an authentication key associated with said subscriber identity module.

Different users of the portable communication apparatus can have their own subscriber identity stored in the phone and the operator would simply store the same authentication key for the users using the same SIM (Subscriber Identity Module) card. This enables for a group of users to share a group of phones. They will always have the same data (phonebook, calendar) on the portable communication apparatus, especially if using only one phone or some synchronization scheme, without having to switch SIM cards and there would still be individual billings.

One embodiment of the invention further comprises the step of providing a plurality of authentication keys associated with a respective plurality of said subscriber identities.

The advantages of the method are essentially the same as described above for the portable communication apparatus.

BRIEF DESCRIPTION OF THE DRAWINGS

An embodiment of the present invention will now be described in more detail, reference being made to the enclosed drawings, in which.

DETAILED DESCRIPTION OF AN EMBODIMENT OF THE INVENTION

Figure 1:
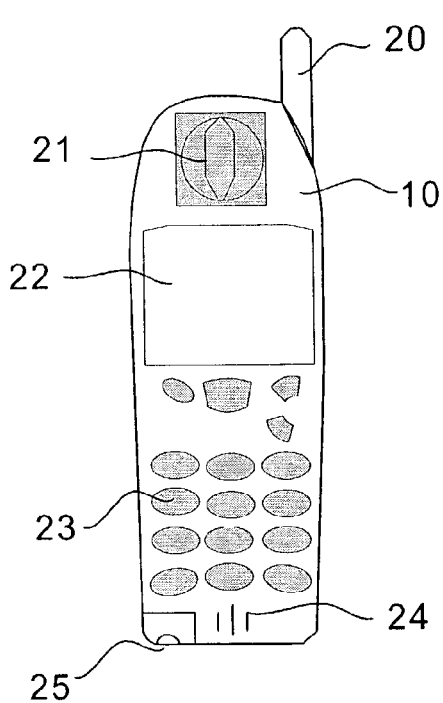
FIG. 1 is a schematic front view of a portable communication apparatus.

FIG. 1 shows a portable communication apparatus and more specifically a mobile telephone 10. The mobile telephone may be any commercially available device for a mobile telecommunications system such as GSM, UMTS, PDC, AMPS or D-AMPS.

As is well known in the technical field, the mobile telephone 10 comprises an antenna 20, a loudspeaker 21, a display 22, a plurality of keys 23, and a microphone 24. The mobile phone also comprises a camera arrangement 25.

Figure 2:
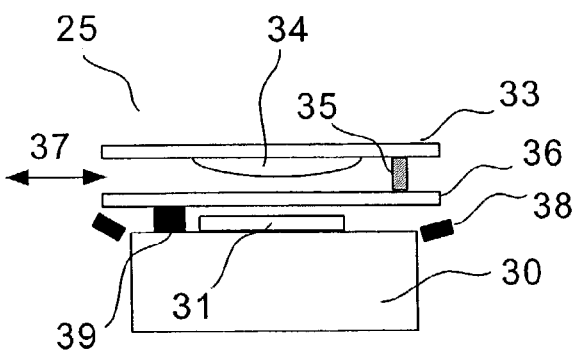
FIG. 2 is a cross-sectional view of a camera arrangement according to the invention.

FIG. 2 illustrates a cross-sectional view of the camera arrangement 25 comprising a camera module 30 arranged to register images, a camera lens 31 and a slidable cover 33 comprising a correction lens 34. The correction lens 34 is made of polycarbonate. It can also be made of glass or crystal glass. The diameter of the correction lens is about 1.5 to 2 mm. The dimension of the correction lens 34 is dependent of the focal length and the distance between the correction lens 34 and the camera lens 31. The correction lens 34 is carefully designed which is merely a matter of routine activity for a person skilled in the art of optical lenses. The camera module 30 can then afterwards focus the image as long as the focus is within the focus interval of the camera which is quite large for these types of camera lenses as mentioned before.

The slidable cover 33 also comprises a cleaning felt 35 attached to the outer end side of the slidable cover 33. A protection cover 36 is arranged over the camera lens 31. The protection cover 36 is cleaned every time the felt 35 attached to the slidable cover 33 is either slid in or out as the felt passes over the lens. The felt could be of the same type as used in the CD feeding tray of most car stereos.

The camera arrangement further comprises a slide guide 37 in which the correction lens 34 and the slidable cover 33 is moving. Further the camera arrangement can comprise a switch indicating when the slidable cover 33 is in position, which is indicative of when to register an image with the camera module.

A LED (Light Emitting Diode) with a ring formed light guide 38 is arranged around the opening of camera module 30 to make sure that the object in front of the camera module 30 is illuminated enough. This light ring 38 is activated either when the correction lens is slid over the opening or when an actual fingerprint analysis is to be done.

The camera arrangement also comprises an IR detector 39 adjacent to the correction lens. The IR detector 39 is used to check if it is a real finger that is pressed against the correction lens by sensing the body heat from the finger.

Figure 3:
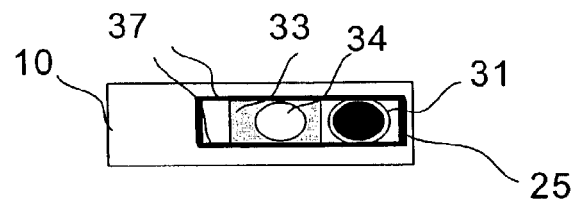
FIG. 3 is a front view of a camera arrangement according to the invention.

FIG. 3 illustrates a front view of the camera arrangement 25 in the mobile telephone 10. It shows the camera lens 31, the slidable cover 33 with the correction lens 34, and the slide guides 37. The slidable cover 33 can be slid over the camera lens 31 so that the correction lens 34 is over the opening of the camera module 30 and correct focus is achieved.

Figure 4:
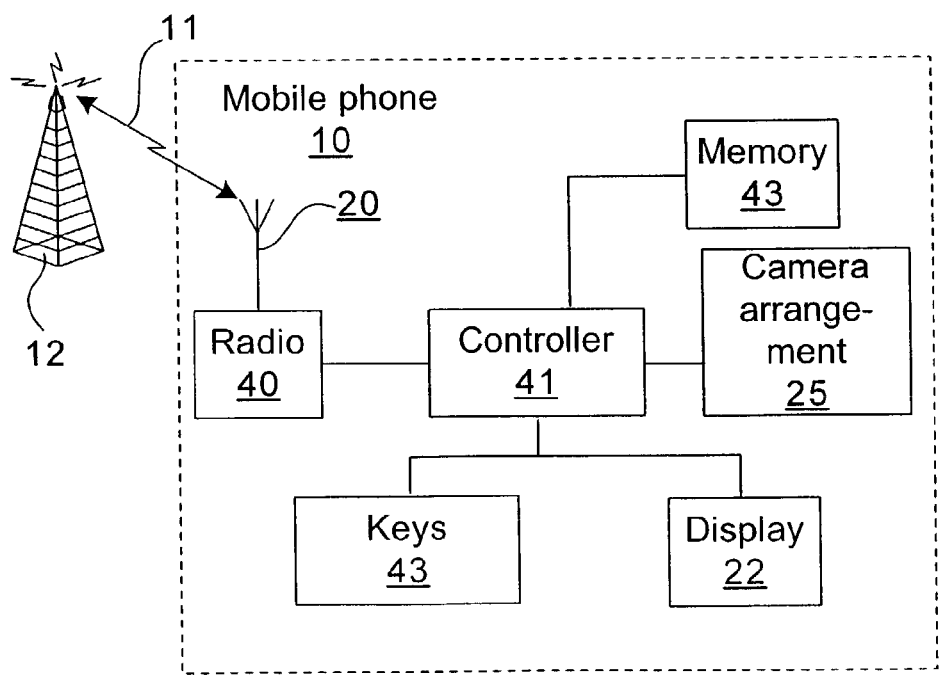
FIG. 4 is a schematic block diagram of some internal components of the portable communication apparatus.

FIG. 4 illustrates some internal components, within the context of the present invention, of a mobile telephone 10. A controller 41 is responsible for the overall operation of the mobile telephone 10 and is preferably implemented by any commercially available CPU ("Central Processing Unit"), DSP ("Digital Signal Processor") or any other electronic programmable logic device. The controller 41 is coupled to a radio interface 20, 40, comprising the antenna 20 and radio circuitry 40. The radio interface 20, 40 is responsible for establishing and maintaining a wireless link 11 to the base transceiver station 12. As is well known to a man skilled in the art, the radio circuitry 40 comprises a series of analogue and digital electronic components, which together form a radio receiver and transmitter. The radio circuitry 40 comprises, i.a., band pass filters, amplifiers, mixers, local oscillators, low pass filters, AD converters, etc.

The controller 41 is also connected to an electronic memory 42, such as a RAM memory, a ROM memory, an EEPROM memory, a flash memory, or any combination thereof. The memory 42 is used for various purposes by the controller 41, one of them being for storing data and program instructions, which form a man-machine interface. A man-machine interface also involves a keypad 43 (corresponding to the keys 23 in FIG. 1) and a display 44 (corresponding to the display 22 in FIG. 1). A user 46 of the mobile telephone 10 will operate the telephone through the man-machine interface, as is well known per se. The controller is also connected to the camera arrangement 25. The controller 41 can be arranged to analyze the images registered with the camera arrangement 25.

Figure 5:
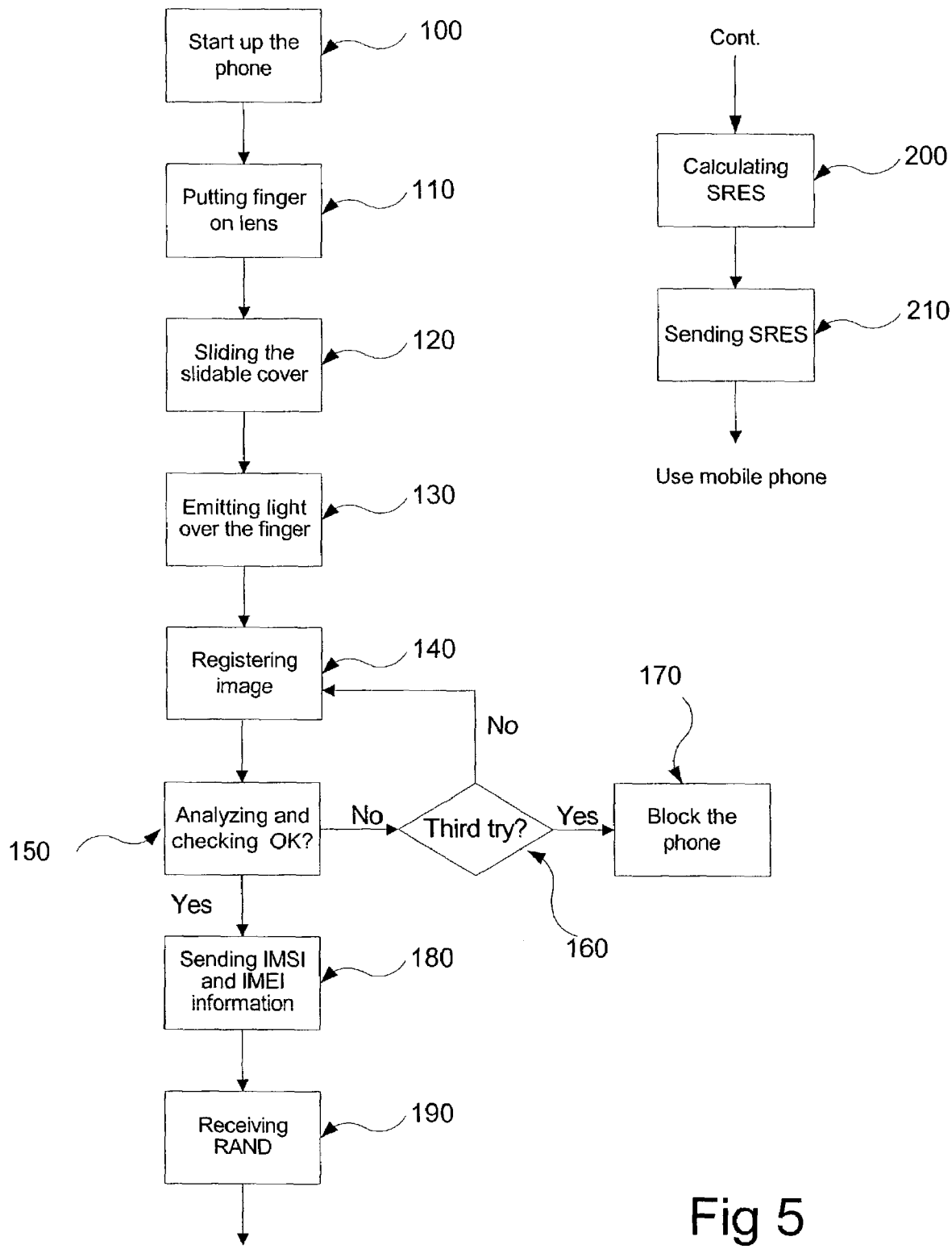
FIG. 5 is a schematic flowchart of a method according to the invention.

The camera arrangement could be used for logging on the mobile telephone to a communication network. This will be described in the following with reference to FIG. 5. The initial step 100 is to start up the mobile phone 10. The user is putting in step 110 his finger on the correction lens 34. He is then in step 120 sliding the slidable cover 33 and the correction lens 34 with his finger in position over the camera lens 31. The focus of the finger is then sharp on the registering part of the camera module 30. The light guide is, in step 130, illuminating the finger and the camera module is, in step 140, registering an image of the finger. The controller 41 is, in step 150, analyzing and checking if the fingerprint of the finger in the image is an approved fingerprint stored in a list.

Figure 6:
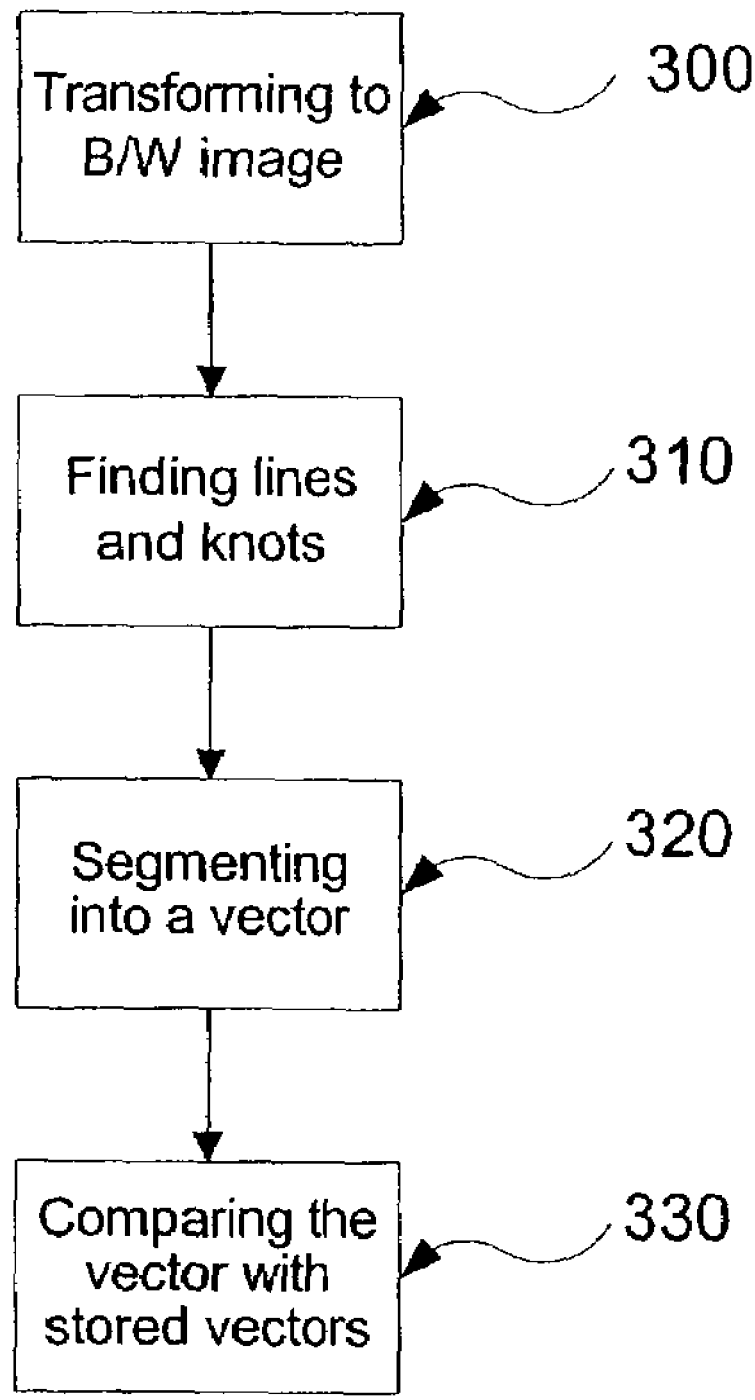
FIG. 6 is a schematic flowchart of a method according to the invention.

The fingerprint analysis 150 comprises the following step explained with reference to FIG. 6. Transforming, in step 300, the registered image to a clear B/W (Black/White) image. It further comprises the steps of finding the lines and knots in step 310 and in step 320 segmenting the lines and knots which results in a vector representing the fingerprint. Next, the analysis 150 further comprises the step of comparing 330 the vector with vector information representing authorized fingerprints stored in the mobile phone. It is not the image of the fingerprint that is stored but the vector information for the authorization.

If the fingerprint is not approved, the step of registering 140 and analyzing and checking 150 is repeated, in step 160, up to three times. If the third try fails, the mobile phone is blocked in step 170.

If the fingerprint is approved, the mobile phone is sending, in step 180, IMSI (International Mobile Subscriber Identity) and IMEI (International Mobile Equipment Identity) information to the communication network. The mobile phone is then receiving, in step 190, a RAND (Random number) from the network. The controller 41 is then calculating, in step 200, a SRES (Signed Response) from the received RAND and a stored authentication key, Ki. The mobile phone is sending, in step 210, the SRES to the communication network. The mobile phone can now be used.

Many users can use the same mobile phone. One fingerprint is associated with one user. A respective user identity could be set to correspond to each of the approved fingerprints thus providing for different profiles for different users. This is done by assigning a piece of the internal memory of the mobile phone to each of the users, and in this way the users can have their personal address book and SMS (Short Message Service) inboxes and outboxes.

The different users could also have their own IMSI stored in the telephone and the operator would then simply store the same authentication key, Ki for the users using the same SIM card. In this way a one-to-many relationship between IMEI and IMSI is established. Together with some synchronization mechanism this provides for the possibility for a group of users to share a group of phones, and they will always have the same data (phonebook, calendar) on the phone currently chosen without having to switch SIM cards and there would be individual billings.

The same flowchart as above also describes the multi-user access. The controller 41 is, in step 150, analyzing and checking if the fingerprint of the finger in the image is an approved fingerprint stored in a list. Certain relevant vector information of the registered fingerprint is extracted and compared with stored vector information representing authorized fingerprints. A certain user identity is extracted. An IMEI is associated with the user identity. The IMEI can be the same for different users.

It is also possible to have more than one profile tied to every IMSI or user ID, each profile having its own phonebook etc. In this way a group of users could share a group of mobile phones or a single mobile phone without having to switch SIM cards and still have their own protected information stored on the mobile phone.

A single user could also have more than one profile stored on the mobile communications equipment enabling the user to have different profiles, each tied to a user profile identity, for different situations with the profiles either partly sharing data or not sharing data at all. In this way a business man can have his mobile phone set up in one way, when at work not allowing any personal calls coming through and in another way when at home, not allowing any work related calls coming through. This would also help him keep easy track of his appointments as the calendar probably would be less cluttered with appointments not having anything to do with each other.

Examples of data specified for a profile can be phonebook calendar, SMS, MMS and email message archives, background colors, filters for barring calls and ringtones.

The mobile communications equipment could also have shared memory areas that are common to all profiles, or user data profiles, such as a shared phonebook for a family containing phone numbers to other relatives etc or a phonebook for a company holding important phone numbers.

Figure 7:
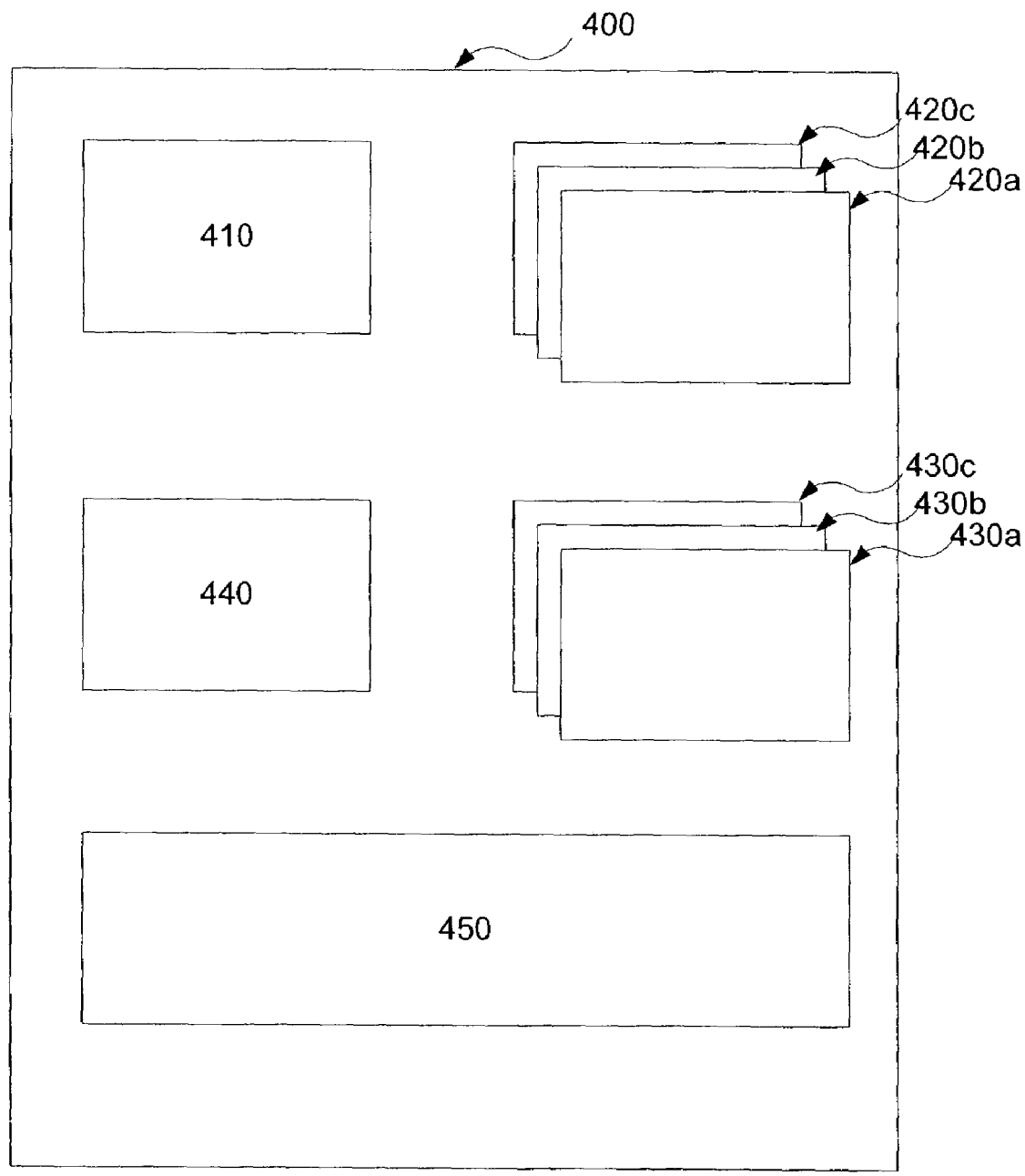
FIG. 7 is a schematic view of a memory and its content according to the invention.

FIG. 7 illustrates a memory 400 in a portable communication apparatus according to the present invention. The memory holds a block 410 that contain profile specific data that specify which of the user data blocks 420*a*, 420*b* and 420*c* that can be accessed by applications 430*a*, 430*b* and 430*c*, that are also stored in the memory, according to which user profile identity that is chosen. As a user logs on, a user profile is determined based on either fingerprint or PIN code—user identity combination. The different allowed combinations are stored in a memory block 440. The profile could also be chosen by the user directly in case the user has access to more than one profile. When a profile has been selected the profile data belonging to that profile is fetched from profile data memory block 410 and certain settings such as background color, ringing tones, call filters, CLI groups etc are altered according to the data fetched. All applications 430 that want to access data 420 that could be profile specific have to clear the access first according to what is specified in the profile data 410.

There is also a commonly shared memory area 450 that all applications have access to. In this are there are typically stored application data (execution files etc) and phonebook, calendar data common to all groups. Some of the user data blocks 420*a,b* and *c* can also be shared among more than one profile according to users whishes. In this case authorization will be needed from all profiles set to share a space at the initial establishing of the sharing relationship.

The present invention thereby provides for a possibility of arranging a mobile communications equipment internal memory according to both user identity (IMSI, International Mobile Subscriber Identity) and profile identity forming one-to-many relationships between IMEI-IMSI and further on between IMSI and profiles which provides for a vast number of possible combinations for setting up a portable communications equipment to be shared by a group of users especially when combined with a synchronization scheme so that a group of communication apparatuses are kept in sync with each other as concerns user data. This would enable any user of a group of user to pick up any mobile phone of a group of mobile phones and still have all his relevant data on that phone without having to remember any PIN codes or switching any SIM cards.

The present invention thus provides for the possibility of having multiple user profiles being tied to multiple user identities (IMSI) that in turn are tied to only one SIM (subscriber Identity Module) card. In the case of having only one phone and one SIM card, the operator in GSM systems could simply store the same authentication key, Ki for all user identities (IMSIs). In the case of more than one phone there are two preferred embodiment. In the first embodiment the operator produces SIM cards having the same authentication key stored on them and in the second embodiment, that is even simpler, the operator group a number of IMSI together having the same Ki instead of having one-to-one IMSI-Ki pairs.

Naturally this division of user data according to a chosen profile can also be implemented in mobile phones having standard PIN code validation for access in which these profiles could be protected with normal number codes and would allow a user to have different profiles for different occasions and situations.

The invention has mainly been described above with reference to a preferred embodiment. However, as is readily appreciated by a person skilled in the art, other embodiments than the ones disclosed above are equally possible within the scope of the invention, as defined by the appended patent claims.

For example the fingerprint could be scanned simply by sliding the slidable cover 33 back and forth with the designated finger. The scanning could also be made static taking one image of the whole print or dynamic by filming a part of the finger as the finger is slid by.

For example, the analysis of the registered images can be a tracking of a movement of an object such as a finger or a pen. This can be done by Image Correlation Processing method (ICP). The ICP algorithm compares a number of images in a time period, e.g. 1500 images per second, and correlates them. The algorithm calculates what direction the tracked object has been moved in, the distance it has moved or how fast, which can be described with a vector in which direction the tracked object has moved compared to the previous image in which the object was moved. The correction lens thus provides for an alternative to a touchpad or pen pad, and the finger or a pen could be used to control GUI (Graphical User Interface) as with a normal mouse or trackball. A double click could be emulated by a quick double tap on the correction lens which would be visible as a quick disappearance and reappearing or a going out of and coming back into focus again in the vicinity of the latest position of the tracked object. This would work to its greatest advantage using a pen or some other narrow pointed object, as the surface of the correction lens would be in the same size order as a normal finger.

The analysis of the registered images could also be an analysis of the iris of the user 46. The eye of the user 46 is then very close to the camera arrangement 25 of the portable communication apparatus 10 when the image is registered.

A piece of felt could also be arranged in the opening of the protection cover 36. The slidable cover 33 would then also be cleaned every time it is slid in or out.

The portable communication apparatus can also for example be a PDA (Personal Digital Assistant), or a camera for connection to PCs, such as a web camera or a built-in camera in PCs and laptops.

The correction lens can be made of rubber. The focus of the lens is changed by stretching the lens. When using this lens only one cover might be necessary slid over the lens for protecting the lens when registering a fingerprint.

The vector information of the fingerprint could also be sent to a network server and be analyzed and checked there as well. The IMSI and IMEI information could be sent together with the vector information associated with the fingerprint. An advantage with this is that there is only one connecting step for the portable communication apparatus and the communication network which is significant for the load of the network. The vector of the fingerprint is then compared to vectors stored in the network.

It is also possible to analyze the retinal of an eye and the user identity can then be associated with the retinal.

We claim:

1. A portable communication apparatus having a camera module with a camera lens, the apparatus comprising:
    a correction lens arranged to operate with said camera module to register an image of a first object and an image of a second object which is capable of being positioned in an immediate vicinity of said correction lens, and
    a controller coupled to said camera module and being arranged to provide a customized first user environment in response to analyzing the image of the first object and arranged to provide a customized second user environment in response to analyzing the image of the second object.

2. A portable communication apparatus according to claim 1, wherein the correction lens is arranged to be moveable between a first position, in which the correction lens has optical influence on the camera module, and a second position, in which the correction lens has no optical influence of the camera module.

3. A portable communication apparatus according to claim 2, wherein the correction lens is arranged to be moveable in a slide guide.

4. A portable communication apparatus according to claim 3, further comprising a detector to indicate to said controller when the correction lens is in said first position.

5. A portable communication apparatus according to claim 2, further comprising light means for illuminating the first and second objects.

6. A portable communication apparatus according to claim 2, further comprising a cleaning felt arranged adjacent to the correction lens so as to clean said camera lens when said correction lens is moved between said first position and said second position.

7. A portable communication apparatus according to claim 1, wherein the apparatus is a mobile telephone.

8. A portable communication apparatus according to claim 1, wherein the apparatus is a PDA having wireless communication capabilities.

9. A portable communication apparatus according to claim 1, further comprising an IR detector arranged adjacent to the correction lens and coupled to said controller so as to detect and report presence of said object.

10. A portable communication apparatus according to claim 1, wherein said first object is a finger, said image of said first object is a fingerprint, and said controller is adapted to provide said customized first user environment in response to analyzing said fingerprint, said customized first user environment comprising data related to at least one of the group consisting of a personalized address book, personalized calendars, personalized color schemes, personalized ring tones, personalized billing information, an international mobile subscriber identity, and an international mobile equipment identity.

11. A portable communication apparatus according to claim 1, wherein said first object is an eye, said image of said first object includes an iris of said eye, and said controller is adapted to analyze the iris of said eye and provide said customized first user environment in response to analyzing the iris of said eye.

12. A portable communication apparatus according to claim 1, wherein the apparatus is used as a cursor position controlling device.

13. A portable communication apparatus according to claim 12, wherein the controller is adapted to analyze a movement of said first object or said second object.

14. A portable communication apparatus having a camera module with a camera lens, the apparatus comprising:
    a correction lens arranged to operate with said camera module to register a fingerprint of a finger which may be positioned in an immediate vicinity of said correction lens;
    an infrared sensor structured to produce an output signal upon sensing a sufficient heat level from said finger; and
    a controller coupled to said camera module and said infrared sensor, wherein said controller is structured to perform an analysis of the fingerprint of said finger in response to receiving said output signal from said infrared sensor.

* * * * *